United States Patent
Harada et al.

(10) Patent No.: US 11,774,015 B2
(45) Date of Patent: Oct. 3, 2023

(54) PIPE JOINT

(71) Applicant: FUJIKIN INCORPORATED, Osaka (JP)

(72) Inventors: Akihiro Harada, Osaka (JP); Tomohiro Nakata, Osaka (JP); Tsuneyuki Okabe, Tokyo (JP); Yuya Shindo, Tokyo (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/797,862

(22) PCT Filed: Mar. 8, 2021

(86) PCT No.: PCT/JP2021/008997
§ 371 (c)(1),
(2) Date: Aug. 5, 2022

(87) PCT Pub. No.: WO2021/182398
PCT Pub. Date: Sep. 16, 2021

(65) Prior Publication Data
US 2023/0024126 A1  Jan. 26, 2023

(30) Foreign Application Priority Data
Mar. 10, 2020 (JP) .................................. 2020-040445

(51) Int. Cl.
*F16L 19/02* (2006.01)
*F16J 15/08* (2006.01)
(Continued)

(52) U.S. Cl.
CPC ........... *F16L 19/0212* (2013.01); *F16J 15/08* (2013.01); *F16L 19/025* (2013.01); *F16L 23/16* (2013.01); *F16L 2201/30* (2013.01)

(58) Field of Classification Search
CPC . F16L 19/0212; F16L 19/0218; F16L 19/025; F16L 2201/30
See application file for complete search history.

(56) References Cited

U.S. PATENT DOCUMENTS 3,521,910 A * 7/1970 Callahan, Jr. ....... F16L 19/0218
3,666,297 A    5/1972 Marks
(Continued)

FOREIGN PATENT DOCUMENTS

CN    102840402 A    12/2012
CN    103270146 A    8/2013
(Continued)

OTHER PUBLICATIONS

International Search Report in International Application No. PCT/JP2021/008997, dated May 11, 2021, along with an English translation thereof.

*Primary Examiner* — Zachary T Dragicevich
(74) *Attorney, Agent, or Firm* — Greenblum & Bernstein, P.L.C.

(57) ABSTRACT

A pipe joint includes first and second sleeves having fluid flow paths communicating with each other; an annular gasket interposed between abutting end surfaces of the sleeves; a male screw member having a through hole into which the first sleeve is inserted; and a female screw member having a through hole into which the second sleeve is inserted, the sleeves being joined by screwing the male screw member with the female screw member, wherein the pipe joint has a leak port opened at a portion of the outer peripheral surface of the male screw member not covered by the female screw member and communicates with a gap between the male screw member and the first sleeve to detect a leak fluid leaked from gaps between the sleeves and the gasket.

9 Claims, 6 Drawing Sheets

(51) Int. Cl.
*F16L 23/16* (2006.01)
*F16L 19/025* (2006.01)

(56) References Cited

U.S. PATENT DOCUMENTS

| | | | | |
|---|---|---|---|---|
| 5,040,714 | A | * | 8/1991 | McManigal ........ F16L 19/0212 |
| 5,645,301 | A | * | 7/1997 | Kingsford ........... F16L 19/0218 |
| 2013/0154253 | A1 | | 6/2013 | Yuhara et al. |
| 2014/0312617 | A1 | | 10/2014 | Okabe et al. |
| 2014/0374122 | A1 | * | 12/2014 | Fanguy ................ F16L 19/025 |
| 2018/0299042 | A1 | | 10/2018 | Ishibashi et al. |

FOREIGN PATENT DOCUMENTS

| | | |
|---|---|---|
| CN | 209781918 U | 12/2019 |
| JP | H5-86086 U1 | 11/1993 |
| JP | 2003-176888 A | 6/2003 |
| JP | 2008-19980 A | 1/2008 |
| JP | 2009-8192 A | 1/2009 |
| JP | 2010-151764 A | 7/2010 |
| JP | 2013-68269 A | 4/2013 |
| JP | 2016-205408 A | 12/2016 |
| TW | 201700893 A | 1/2017 |

* cited by examiner

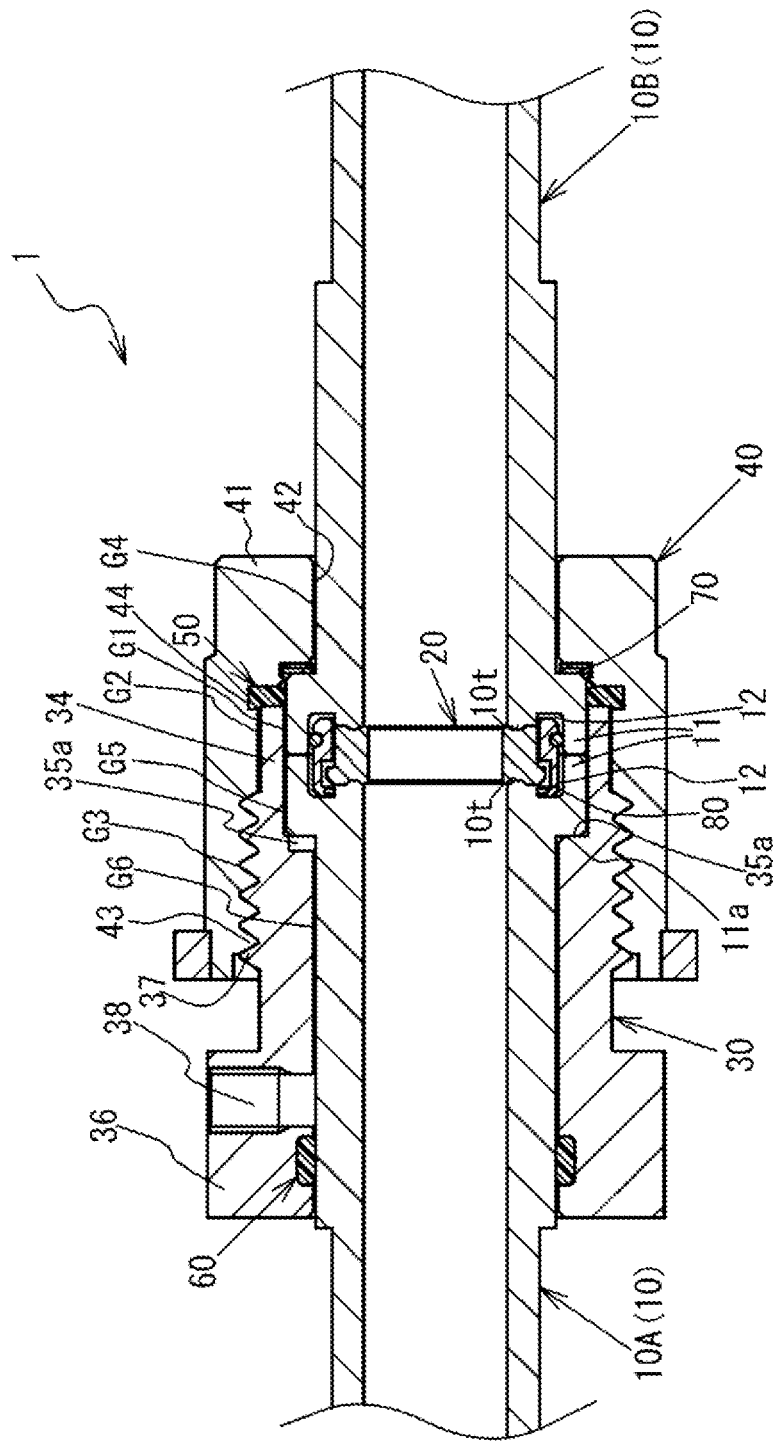
[fig.1]

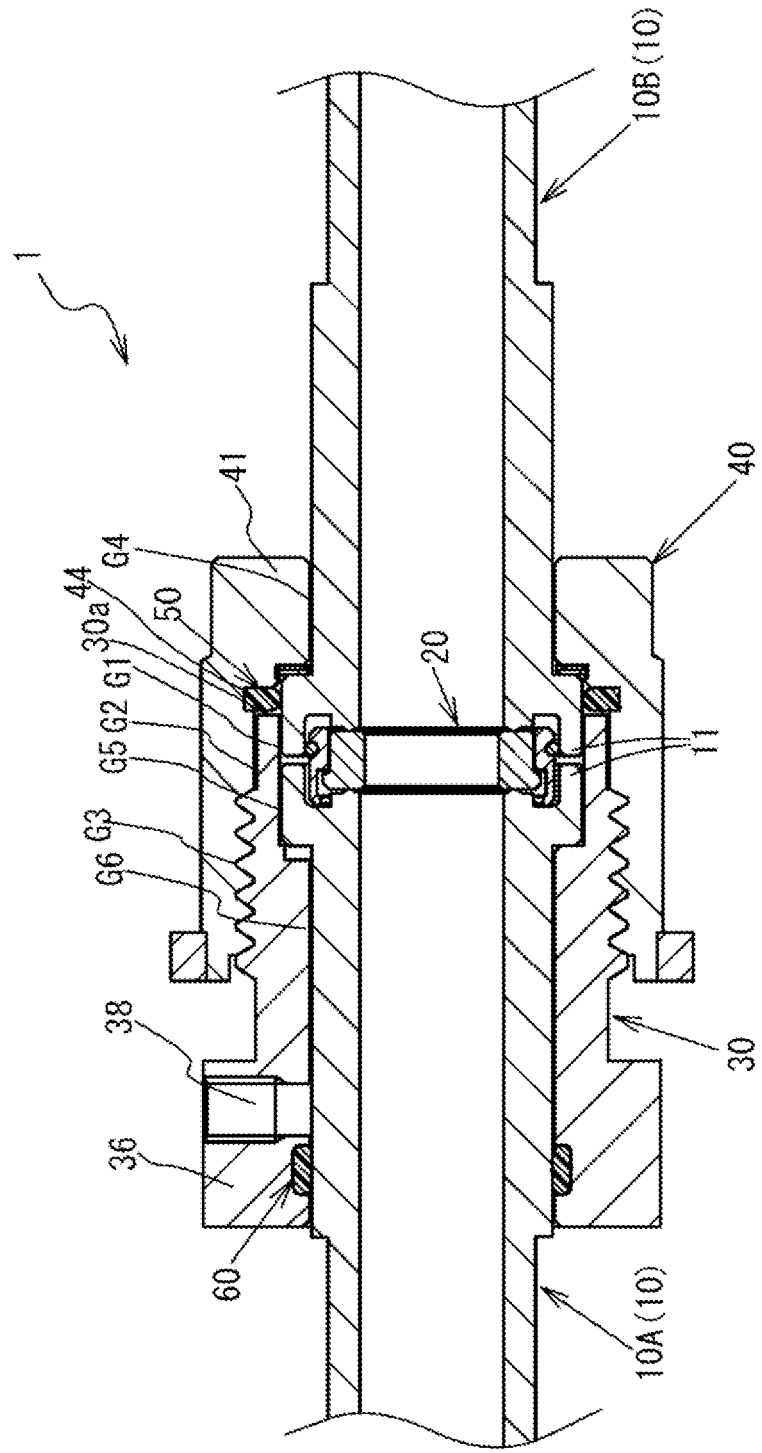
[fig.2]

[fig.3A]
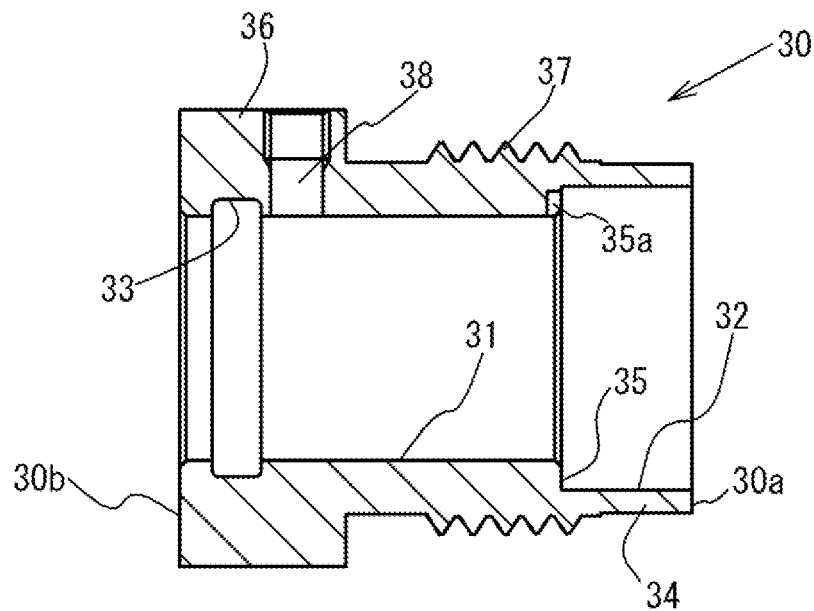
[fig.3B]
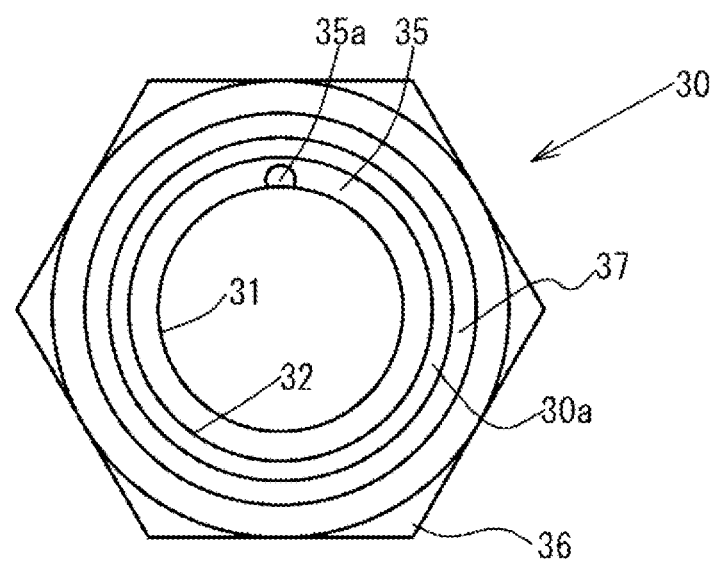

[fig.4]
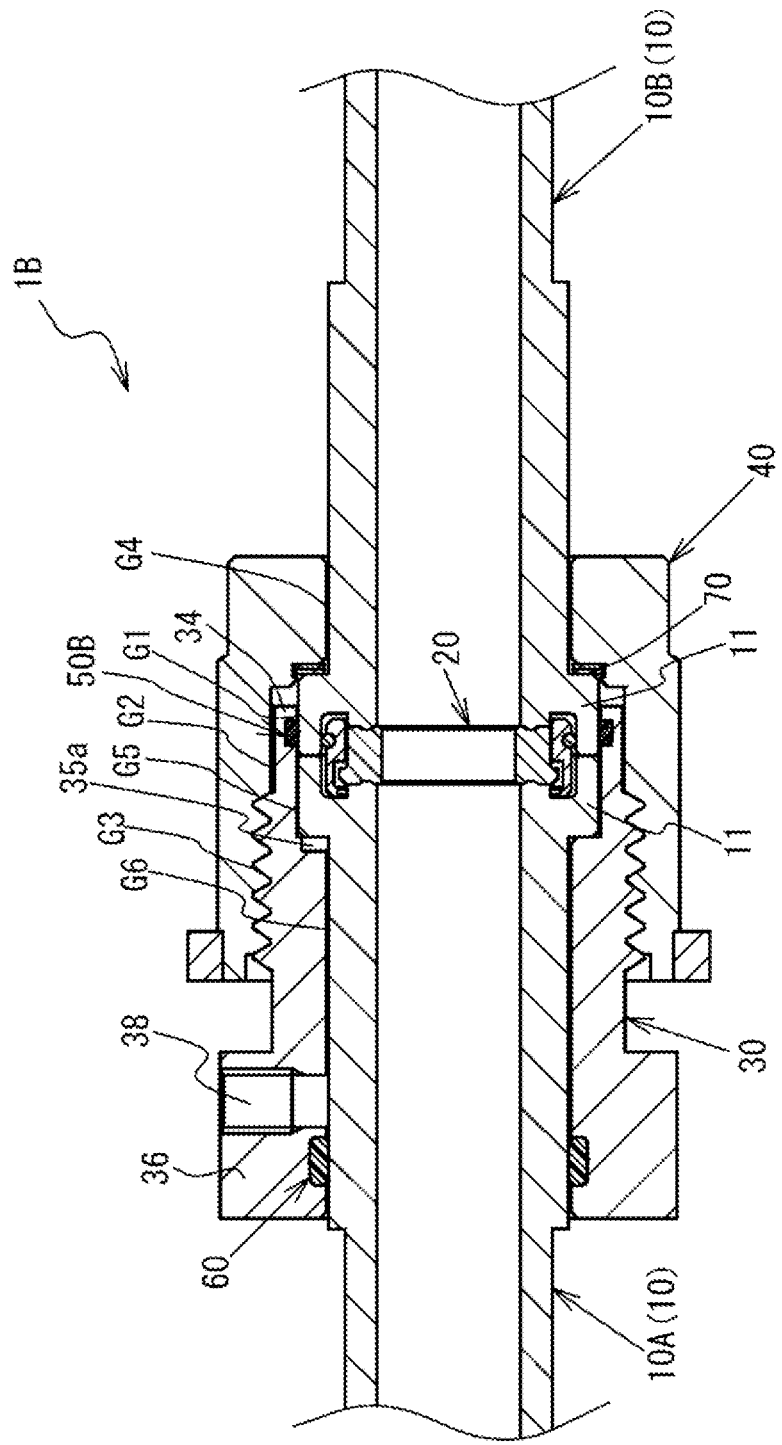

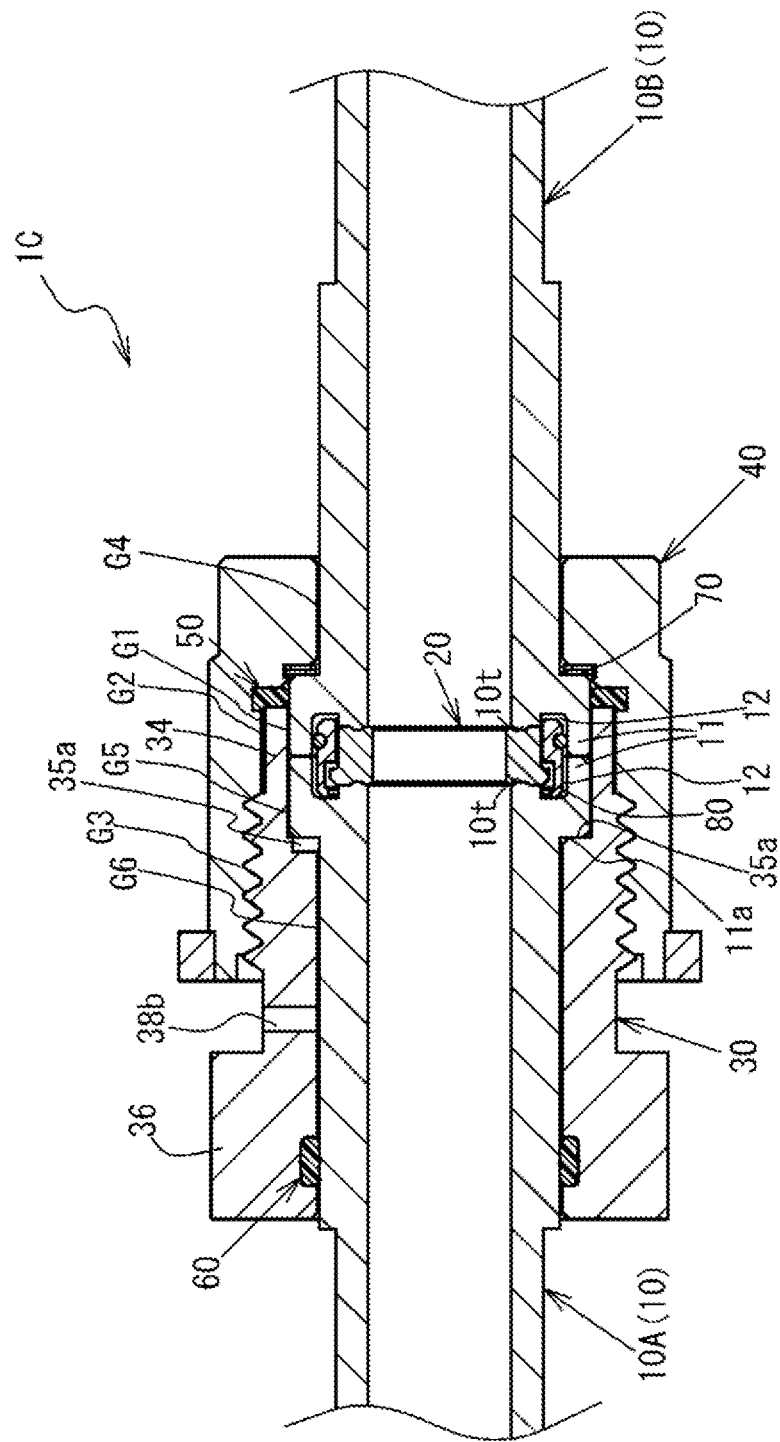
[fig.5]

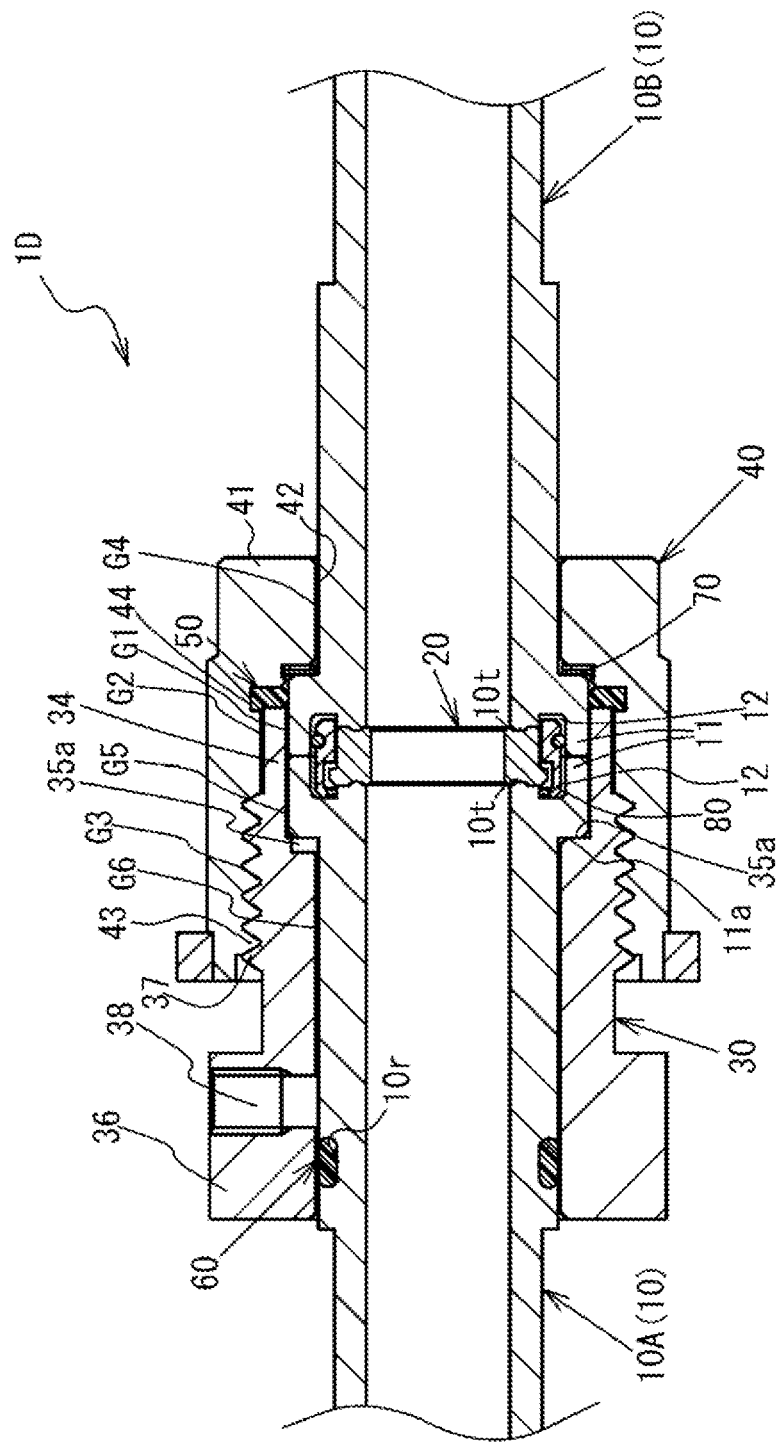
[fig.6]

PIPE JOINT

TECHNICAL FIELD

The present invention relates to a pipe joint, in particular, to a pipe joint having a leak port.

BACKGROUND ART

As pipe joints for connecting various valves, pipes, and the like that require high cleanliness, high chemical resistance, and high sealing properties of semiconductor manufacturing apparatus and the like, for example, joints shown in Patent Literature 1 and Patent Literature 2 are known. Such a pipe joint has first and second sleeves, which are pipe members each having a flange portion and a seal portion at one end portion, the one end portions (joint side end portions) of the first and second sleeves are abutted against each other with an annular gasket interposed, and a female screw member (cap nut) engaged with the flange portion of the first sleeve and a male screw member (coupling) engaged with the flange portion of the second sleeve are screwed together so as to join and seal the two sleeves.

PATENT LITERATURE

PTL 1: Japanese Laid-Open Patent Application No. 2013-68269
PTL 2: Japanese Laid-Open Patent Application No. 2016-205408
PTL 3: Japanese Laid-Open Utility model Application No. H05-86086

SUMMARY OF INVENTION

Technical Problem

In the pipe joint as described above, in order to detect leak fluid leaked from the seal portion of the gasket, for example, a leak port is provided in the cap nut. However, in this method, since the cap not is rotated with respect to the coupling that is fixed to the sleeve when the joint is fastened, the position of the leak port is not constant, and the construction work of connecting a leak detection mechanism to the leak port after fastening the joint is not easy.

Further, since the pipe joint as described above has a structure in which the sleeves are connected to each other using a cap nut and a coupling, there are many leakage paths of leak fluid including screw portion in addition to the leak port, and the leak fluid may leak to the outside through other leak paths before the leak fluid reaches the leak port, and accordingly, the leak detection tends to delay, and the detection sensitivity tends to decrease.

For example, as in the technique disclosed in Patent Literature 3, leak paths other than the leak port may be sealed with O-rings to collect leak fluids to the leak port. However, if O-rings are provided in each of a large number of leak paths of a pipe joint as described above, the number of O-rings also increases, and it becomes necessary to provide a plurality of O-rings in a region where a plurality of parts are closely present, which also increases working steps.

One of the objects of the present invention is to provide a pipe joint for which construction work of a leak detection mechanism to a leak port is easy and the leak detection sensitivity is also improved.

Solution to Problem

The pipe joint according to the present invention comprises: first and second sleeves having fluid flow paths communicating with each other; an annular gasket interposed between abutting end surfaces of the first and second sleeves; a male screw member having a through hole into which the first sleeve is inserted; and a female screw member having a through hole into which the second sleeve is inserted; the first and second sleeves being joined by screwing the male screw member with the female screw member;

wherein the pipe joint has a leak port opened at an outer peripheral surface of the male screw member at a portion not covered by the female screw member and communicates with a gap between the male screw member and the first sleeve to detect leak fluid leaked from gaps between the first and second sleeves and the gasket, which is.

When the male screw member and the female screw member are fastened, the male screw member is fixed with respect to the first and second sleeves, and the female screw member is rotated with respect to the first and second sleeves. Preferably, the second seal member is deformed between the first sleeve and the male screw member to serve as a temporary fixing member that restricts rotation of the male screw member with respect to the first sleeve.

Preferably, a configuration may be adopted in which the male screw member has a tip end portion that is formed in a cylindrical shape, extends to the second sleeve and covers an outer peripheral surface of an abutting portion between the first sleeve and the second sleeve, and the pipe joint further comprises:

an annular first seal member that prevents the leak fluid from leaking through a gap between the tip end portion of the male screw member and the second sleeve to a gap formed in a screwed portion between the male screw member and the female screw member and a gap between the second sleeve and the female screw member, and an annular second seal member arranged on a rear end (opposite to the second sleeve) side of a position of the leak port and sealing a gap between the first sleeve and the male screw member.

More preferably, a configuration may be adopted in which the first seal member is held by the female screw member, is compressed and deformed between a tip end surface of the male screw member and the female screw member as tightening of the female screw member progresses, and comes into close contact with the outer peripheral surface of an abutting portion of the second sleeve.

More preferably, a configuration may be adopted in which the first seal member is deformed to prevent the leak fluid from leaking through the gap between the tip end portion of the male screw member and the second sleeve to the gap between the tip end portion of the male screw member and the female screw member leading to the screwed portion, and to a gap between the second sleeve and the female screw member.

Alternatively, a configuration may be adopted in which the first seal member is arranged between the tip end portion of the male screw member and the abutting portion of the second sleeve.

Preferably, a configuration may be adopted in which the first and second sleeves each has a flange portion in the abutting portion, the male screw member comprises: a small diameter hole portion in which the first sleeve is inserted; a large diameter hole portion which has a diameter larger than an inner diameter of the small diameter hole portion and receives the flange portion of the first sleeve; and an annular engagement surface formed by a step between the small diameter hole portion and the large diameter hole portion and abuts on an annular wall surface of the flange portion of the first sleeve, and a groove portion that communicates the gap between the first sleeve and the small diameter hole portion and the gap between the flange portion and the large diameter hole portion is formed on a part of the engagement surface or the wall surface.

The pipe joint of the present invention comprises: first and second sleeves having fluid flow paths communicating with each other; an annular gasket interposed between abutting end faces of the first and second sleeves; a male screw member having a through hole into which the first sleeve is inserted; and a female screw member having a through hole into which the second sleeve is inserted, the first and second sleeves being joined by screwing the male screw member with the female screw member, wherein the pipe joint has a leak port which communicates with a space in contact with an outer periphery of the gasket through a through hole of the male screw member in a portion of an outer peripheral surface of the male screw member not covered by the female screw member.

Advantageous Effects of Invention

According to the present invention, it is possible to obtain a pipe joint for which construction work of a leak detection mechanism to a leak port is easy and the leak detection sensitivity is improved.

BRIEF DESCRIPTION OF DRAWINGS

FIG. 1 is a longitudinal cross-sectional view of a pipe joint according to an embodiment of the present invention.

FIG. 2 is a longitudinal cross-sectional view showing a state before fastening the pipe joint in FIG. 1.

FIG. 3A is a longitudinal cross-sectional view of a male screw member.

FIG. 3B is a right side view of the male screw member.

FIG. 4 is a longitudinal cross-sectional view showing a modification of the pipe joint according to an embodiment of the present invention.

FIG. 5 is a longitudinal cross-sectional view showing still another modification of the pipe joint according to an embodiment of the present invention.

FIG. 6 is a longitudinal cross-sectional view showing still another modification of the pipe joint according to an embodiment of the present invention.

DESCRIPTION OF EMBODIMENTS

Embodiments of the present invention will be described below with reference to the drawings.

FIG. 1 is a longitudinal cross-sectional view showing a pipe joint according to the present embodiment.

Pipe joint 1 includes two sleeves 10 (10A,10B) that are pipe members whose one ends are abutted each other and having fluid flow paths communicate with each other, an annular gasket 20 interposed between the abutting end surfaces of the sleeve 10A and 10B, a substantially cylindrical male screw member 30 fitted to the outer periphery of the sleeve 10A, a substantially cylindrical female screw member 40 fitted to the outer periphery of the sleeve 10B, an annular seal member 50 held by the female screw member 40, and an annular seal member 60 held by the male screw member 30.

The inside of the sleeve 10 is a fluid flow path, a flange portion 11 is provided at the abutting end portion, and a sealing portion 10t is formed on the abutting end surface so as to project in an annular shape in the axial direction of the sleeve 10 and abut on the gasket 20 for sealing. The sleeves 10 are, for example, made of a metal such as stainless steel of SUS316L.

The gasket 20 and a retainer 80 for holding the gasket 20 are accommodated in recesses 12 formed respectively in the abutting portions of the sleeves 10A, 10B, and the retainer 80 is mounted to the recess 12 on the sleeve OA side.

The gasket 20 is made of a metal such as a nickel-alloy, and is pressed between the sealing portions 10t of the sleeves 10A, 10B and plastically deformed, thereby sealing gaps between the sleeve 10A and the sleeve 10B and the gasket 20.

The male screw member 30, as shown in FIG. 3A and FIG. 3B, is a metal member formed in a cylindrical shape, and a small diameter hole portion 31 into which the sleeve 10A is inserted and a large diameter hole portion 32 having a larger diameter than the inner diameter of the small diameter hole portion 31 and for receiving the flange portion 11 of the sleeve 10A, are formed therein. An annular engagement surface 35 formed by a step between the small diameter hole portion 31 and the large diameter hole portion 32 abuts against an annular wall surface 11a of a rear end side of the flange portion 11 of the sleeve 10A. An arcuate groove 35a is formed in a part of the engagement surface 35 in the circumferential direction. The groove 35a, as will be described later, is provided to ensure flow path of the leak fluid.

A male screw 37 is formed on the outer peripheral surface of the male screw member 30, and a tip end portion 34 formed in a cylindrical shape is formed on the distal end side (right side in FIG. 3) of the male screw 37. As shown in FIG. 1, the tip end portion 34 extends to the sleeve 10B (the outer peripheral surface of the flange portion 11) and covers the outer peripheral surface of the abutting portion between the sleeve 10A and the sleeve 10B. An annular-shaped tip end surface 30a of the tip end portion 34 presses the seal member 50 held by the sleeve 10B, as will be described later.

A tool engagement portion 36 having a hexagonal shape to which a tool is to be engaged is formed on a rear end surface 30b side of the outer peripheral surface of the male screw member 30. A leak port 38 that opens on the outer peripheral surface and communicates with the small diameter hole portion 31 is formed in the tool engagement portion 36. In FIG. 1, the leak port 38 has a screw formed inside to attach a leak detection mechanism (not shown).

A groove 33 on which the seal member 60 is to be mounted is formed on the rear end surface 30b side of the small diameter hole portion 31 of the male screw member 30.

Incidentally, the seal member 60 may be mounted in a groove provided in the sleeve 10A.

Returning to FIG. 1, the female screw member 40 is a so-called cap nut, which is formed in a cylindrical shape, a through hole 42 into which the outer peripheral surface of the sleeve 10B is inserted is formed in the center portion of the rear end portion 41, and a co-rotation prevention member 70 (preferably a washer and a bearing) is provided between the rear end portion 41 and the flange portion 11 of the sleeve 10B. A groove 44 for mounting the seal member 50 is formed at a position adjacent to the rear end portion 41 on the inner peripheral surface of the female screw member 40, and a female screw 43 to be screwed with the male screw 37 of the male screw member 30 is formed on the opposite side of the rear end portion 41.

The seal member 50 is made of a resin, and as shown in FIG. 2, is not deformed except in the portion mounted in the groove before the pipe joint 1 is fastened. When the male screw member 30 and the female screw member 40 are fastened, the male screw member 30 is fixed with respect to the sleeves 10A,10B, and the female screw member 40 is rotated with respect to the sleeves 10A,10B. The ends opposite to the abutting portion of the sleeves 10A,10B are connected to tubes (not shown) by welding or the like.

The seal member 50 is compressed and deformed between the tip end surface 30a of the male screw member 30 and a wall surface of the rear end portion 41 of the female screw member 40 along with the progress of tightening of the female screw member 40, and as shown in FIG. 1, the inner peripheral surface curved in an R-shape comes into close con tact with the outer peripheral surface of the flange portion 11 of the sleeve 10B.

The seal member 60 is made of a resin and is fitted to the outer peripheral surface of the sleeve 10A in an elastically deformed state. When the seal member 60 is deformed and comes into close contact with the outer peripheral surface of the sleeve 10A, the seal member 60 serves as a temporary fixing member that restricts rotation of the male screw member 30 with respect to the sleeve 10A. The seal member 60 prevents the male screw member 30 from rotating with respect to the sleeve 10A when the female screw member 40 is tightened.

In the pipe joint 1, a plurality of gaps G1 to G6 into which a leak fluid can penetrate are formed.

The gap G1 is formed between the inner peripheral surface of the large diameter hole portion 32 of the male screw member 30 and the outer peripheral surface of the flange portion 11 of the sleeve 10B.

The gap G2 is formed between the outer peripheral surface of the tip end portion 34 of the male screw member 30 and the inner peripheral surface of the female screw member 40.

The gap G3 communicates with the gap G2, and is formed in a screwed portion between the male screw 37 of the male screw member 30 and the female screw 43 of the female screw member 40.

The gap G4 is formed between the outer peripheral surface of the sleeve 10B and the inner peripheral surface of the through hole 42 of the female screw member 40.

The gap G5 is formed between the outer peripheral surface of the flange portion 11 of the sleeve 10A and the inner peripheral surface of the large diameter hole portion 32 of the male screw member 30.

The gap G6 is formed between the outer peripheral surface of the sleeve 10A and the inner peripheral surface of the small diameter hole portion 31 of the male screw member 30.

In the absence of seal member 50, the gaps G1 to G4 communicate with each other. The seal member 50 is deformed to seal the gap G1 and the gap G2, and prevents the leak fluid from leaking through the gap G1 to the gaps G2,G3 and the gap G4.

The gap G5 and the gap G6 communicates through the groove 35a of the engagement surface 35 of the male screw member 30.

When the pipe joint 1 is fastened, the engagement surface 35 of the male screw member 30 comes into close contact with the wall surface 11a to possibly block the communication between the gap 05 and the gap G6, but the presense of the groove 35a of the engagement surface 35 of the male screw member 30 ensures the communication between the gap G5 and the gap G6.

The leak fluid leaked to the outer periphery of the gasket 20 flows out only to the gap G5 because the gap G1 is sealed by the seal member 50, and flows through the groove 35a and the gap 06 to be collected at the leak port 38. If the leak port 38 is provided with a leak detection mechanism, it is possible to detect a leak with high sensitivity.

According to the present embodiment, since the leak port 38 is provided on the male screw member 30 that dose not rotate, the construction work of the leak detection mechanism to the leak port 38 is easy. In addition, since there is no fluid leak path other than the leak port 38, it is also possible to improve the leak detection sensitivity.

FIG. 4 shows a modification of the pipe joint of the present invention. The same reference numerals are used for the same components as those in the above embodiment among the components in FIG. 4.

In the pipe joint 1B, instead of the seal member 50 described above, a seal member 50B is provided between the outer peripheral surface of the flange portion 11 of the sleeve 10B and the inner peripheral surface of the tip end portion 34 of the male screw member 30 to seal the gap G1. According to such a configuration, the leak fluid can be prevented from flowing out to the gaps G2, G3 and G4 through the gap G1.

FIG. 5 shows still another modification of the pipe joint of the present invention. The same reference numerals are used for the same components as those in the above embodiment among the components in FIG. 5.

In the pipe joint 1C, a leak port 38b is formed in the front side of the tool engagement portion 36 at a position not covered by the female screw member 40 instead of the leak port 38 provided in the tool engagement portion 36 of the male screw member 30.

FIG. 6 shows still another modification of the pipe joint of the present invention. The same reference numerals are used for the same components as the pipe joint 1 shown in FIG. 1 among the components in FIG. 6.

The difference between the pipe joint 1D and the pipe joint 1 shown in FIG. 1 is that the pipe joint 1D is provided with the seal member 60 in a groove 10r formed in the sleeve 10A.

According to this configuration, without mounting the seal member 60 in the groove 10r and in a state that the sleeve 10A is inserted to the male screw member 30, it is possible to connect the end portion of the sleeve 10A (not shown) and a tube (not shown) by welding, and thereafter, to mount the seal member 60 in the groove 10r. As a result, it is possible to prevent the seal member 60 from being affected by heat due to the welding.

The present invention is not limited to the above embodiments, and various modifications can be made without departing from the concept and scope of the present invention.

REFERENCE SIGNS LIST 1, 1B, 1C, 1D: Pipe joint
10, 10A, 10B: Sleeve
10t: Sealing portion
10r: Groove
11: Flange portion
11a: Wall surface
12: Recess 20: Gasket
30: Male screw member
30a: Tip end surface
30b: Rear end surface
31: Small diameter hole portion (through hole)
32: Large diameter hole portion
33: Groove
34: Tip end portion
35: Engagement surface
35a: Groove
36: Tool engagement portion
37: Male screw
38, 38b: Leak port
40: Female screw member
41: Rear end portion
42: Through hole
43: Female screw
44: Groove
50, 50B, 60: Seal member
70: Co-rotation prevention member
80: Retainer
G1-G6: Gap

The invention claimed is:

1. A pipe joint comprising:
first and second sleeves having fluid flow paths communicating with each other;
an annular gasket interposed between abutting end surfaces of the first and second sleeves;
a male screw member having a through hole into which the first sleeve is inserted; and a female screw member having a through hole into which the second sleeve is inserted, the first and second sleeves being joined by screwing the male screw member with the female screw member,
wherein the pipe joint has a leak port that opens at an outer peripheral surface of the male screw member at a portion not covered by the female screw member and communicates with a gap between the male screw member and the first sleeve to detect a leak fluid leaked from gaps between the first and second sleeves and the gasket.

2. The pipe joint according to claim 1, wherein the male screw member is fixed with respect to the first and second sleeves and the female screw member is rotated with respect to the first and second sleeves when the male screw member and the female screw member are fastened.

3. The pipe joint according to claim 1, wherein the male screw member has a tip end portion that is formed in a cylindrical shape, extends to the second sleeve and covers an outer peripheral surface of an abutting portion between the first sleeve and the second sleeve, and
the pipe joint further comprises:
an annular first seal member that prevents the leak fluid from leaking through a gap between the tip end portion of the male screw member and the second sleeve to a gap formed in a screwed portion between the male screw member and the female screw member and a gap between the second sleeve and the female screw member; and
an annular second seal member arranged on a rear end side of a position of the leak port in the male screw member and seals a gap between the first sleeve and the male screw member.

4. The pipe joint according to claim 3, wherein the second seal member is deformed between the first sleeve and the male screw member to serve as a temporary fixing member that restricts rotation of the male screw member with respect to the first sleeve.

5. The pipe joint according to claim 3, wherein the first seal member is held by the female screw member, is compressed and deformed between a tip end surface of the male screw member and the female screw member as tightening of the female screw member progresses, and comes into close contact with an outer peripheral surface of an abutting portion of the second sleeve.

6. The pipe joint according to claim 4, wherein the first seal member is deformed to prevent the leak fluid from leaking through the gap between the tip end portion of the male screw member and the second sleeve, to the gap between the tip end portion of the male screw member and the female screw member leading to the screwed portion, and to the gap between the second sleeve and the female screw member.

7. The pipe joint according to claim 3, wherein the first seal member is provided between the tip end portion of the male screw member and the abutting portion of the second sleeve.

8. The pipe joint according to claim 1, wherein the first and second sleeves each has a flange portion in an abutting portion,
the male screw member comprises: a small diameter hole portion in which the first sleeve is inserted; a large diameter hole portion which has a diameter larger than an inner diameter of the small diameter hole portion and receives a flange portion of the first sleeve; and an annular engagement surface formed by a step between the small diameter hole portion and the large diameter hole portion and abuts on an annular wall surface of the flange portion of the first sleeve, and
a groove portion that communicates a gap between the first sleeve and the small diameter hole portion and a gap between the flange portion and the large diameter hole portion is formed on a part of the engagement surface or the wall surface.

9. A pipe joint comprising: first and second sleeves having fluid flow paths communicating with each other; an annular gasket interposed between abutting end surfaces of the first and second sleeves; a male screw member having a through hole into which the first sleeve is inserted; and a female screw member having a through hole into which the second sleeve is inserted, the first and second sleeves being joined by screwing the male screw member with the female screw member,
wherein the pipe joint has a leak port which communicates with a space in contact with an outer periphery of the gasket through a through hole of the male screw member in a portion of an outer peripheral surface of the male screw member not covered by the female screw member.

* * * * *